US012789941B2

(12) United States Patent
Chen et al.

(10) Patent No.: US 12,789,941 B2
(45) Date of Patent: Nov. 10, 2026

(54) BRAKE SYSTEM WITH ENCLOSED HYDRAULIC CYLINDER

(71) Applicant: LANXI JIEKE SPORTS APPARATUS MANUFACTURG CO., LTD., Zhejiang Province (CN)

(72) Inventors: Yao Chen, Zhejiang Province (CN); Yihuai Wang, Zhejiang Province (CN); Chengguo Zheng, Zhejiang Province (CN)

(73) Assignee: Lanxi Jieke Sports Apparatus Manufacturg Co., Ltd, Lanxi City (CN)

( * ) Notice: Subject to any disclaimer, the term of this patent is extended or adjusted under 35 U.S.C. 154(b) by 450 days.

(21) Appl. No.: 18/477,778

(22) Filed: Sep. 29, 2023

(65) Prior Publication Data

US 2024/0317355 A1 Sep. 26, 2024

(30) Foreign Application Priority Data

Mar. 22, 2023 (TW) ................................ 112202586

(51) Int. Cl.
*B62L 3/02* (2006.01)

(52) U.S. Cl.
CPC .................................... *B62L 3/023* (2013.01)

(58) Field of Classification Search
CPC .. B62L 3/023; B62L 3/026; B62L 3/02; B62L 1/02; B62K 19/38; B62K 23/06; B62K 23/02
See application file for complete search history.

(56) References Cited

U.S. PATENT DOCUMENTS

| | | | | |
|---|---|---|---|---|
| 11,492,068 | B2 * | 11/2022 | Zenere | F16D 25/083 |
| 2014/0038757 | A1 * | 2/2014 | Kariyama | B60T 17/043 188/344 |
| 2015/0367908 | A1 * | 12/2015 | Kariyama | F16D 55/22 188/344 |
| 2018/0141611 | A1 * | 5/2018 | Komada | B62M 25/08 |
| 2018/0304960 | A1 * | 10/2018 | Komada | B62L 3/023 |
| 2019/0031279 | A1 * | 1/2019 | Nakai | F15B 7/08 |
| 2020/0172193 | A1 * | 6/2020 | Zenere | B62L 3/023 |

FOREIGN PATENT DOCUMENTS

| | | | | |
|---|---|---|---|---|
| CN | 104512512 A | * | 4/2015 | B62L 3/023 |

* cited by examiner

*Primary Examiner* — Vishal R Sahni
(74) *Attorney, Agent, or Firm* — Rosenberg, Klein & Lee

(57) ABSTRACT

A brake system includes a bicycle frame and a housing which is mounted to the bicycle frame. The housing includes an oil chamber for brake fluid storage, and one of two ends of the housing is hinged to a brake lever via a hinge. The brake lever includes an arm for compressing the brake fluid within the oil chamber to initiate braking. The housing has a connector connected to another one of the two ends thereof. The connector communicates with the oil chamber and is located close to the bicycle frame. An output end of the connector is connected to a hose that runs along the bicycle frame.

6 Claims, 5 Drawing Sheets

BRAKE SYSTEM WITH ENCLOSED HYDRAULIC CYLINDER

FIELD OF THE INVENTION

The present invention relates to a brake system, and more particularly, to a brake system with an enclosed hydraulic cylinder.

BACKGROUND OF THE INVENTION

The conventional brakes, as one of the essential components of bicycles, have traditionally featured hydraulic disc brakes with their hydraulic cylinders independently installed at the brake levers. This setup often leads to the hydraulic lines not aligning with the bicycle frame, resulting in an exposed arrangement of the hydraulic lines. This not only affects the aesthetics of the bicycle but also increases the likelihood of damage due to the lack of rigid support for the hydraulic lines. To address this issue, we propose an The present invention intends to provide an internally routed brake system with enclosed hydraulic cylinders to eliminate the shortcomings mentioned above.

SUMMARY OF THE INVENTION

The present invention relates to a brake system includes a bicycle frame and a housing which is mounted to the bicycle frame. The housing includes an oil chamber for brake fluid storage. One of two ends of the housing is hinged to a brake lever via a hinge and the brake lever includes an arm for compressing the brake fluid within the oil chamber to initiate braking. The housing includes a connector connected to another one of the two ends thereof, and the connector communicates with the oil chamber and is located close to the bicycle frame. An output end of the connector is connected to a hose that runs along the bicycle frame.

Preferably, the housing includes a communication chamber defined therein which is located away from the arm. The communication chamber communicates with the oil chamber.

Preferably, the housing includes a secondary chamber defined therein and communicating with the oil chamber. A plug screw is located at an opening of the secondary chamber to seal a filling port.

Preferably, the arm includes a piston located within the oil chamber and being slidable along the depth direction of the oil chamber. A spherical screw includes a ball head and a threaded shaft, wherein the ball head extends into the oil chamber and pushes the piston for compressing brake fluid. The threaded shaft is located outside the oil chamber and connected to the brake lever.

Preferably, the connector includes a bolt threadedly connected to the housing and extending into the communication chamber. The bolt has an oil passage, and the output end of the oil passage is open on a wall of the bolt that is located outside the communication chamber. An end part is fitted onto the bolt and includes an oil groove that communicates with the output end of the oil passage of the bolt. A hollow column has one of two ends thereof connected to the outer wall of the end part and communicating with the oil groove.

Preferably, the oil groove of the end part is an annular groove.

Preferably, another one of the two ends of the hollow column is connected to the hose.

Preferably, the hinge includes a torsion spring mounted thereon which provides a returning force for the brake lever.

The present invention offers the following beneficial effects, wherein by configuring the oil chamber and the connector, the routing of the hydraulic lines is transformed to align with the bicycle frame to prevent significant misalignment between the hydraulic lines and the bicycle frame that could lead to damage. Simultaneously, in conjunction with the installation of the arm, when gripping and squeezing the brake lever, rapid braking of the wheel is achieved. The manufacturing and assembly process is straightforward, facilitating easy installation. Additionally, the compression delay of the hydraulic fluid is minimal, resulting in effective braking performance.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
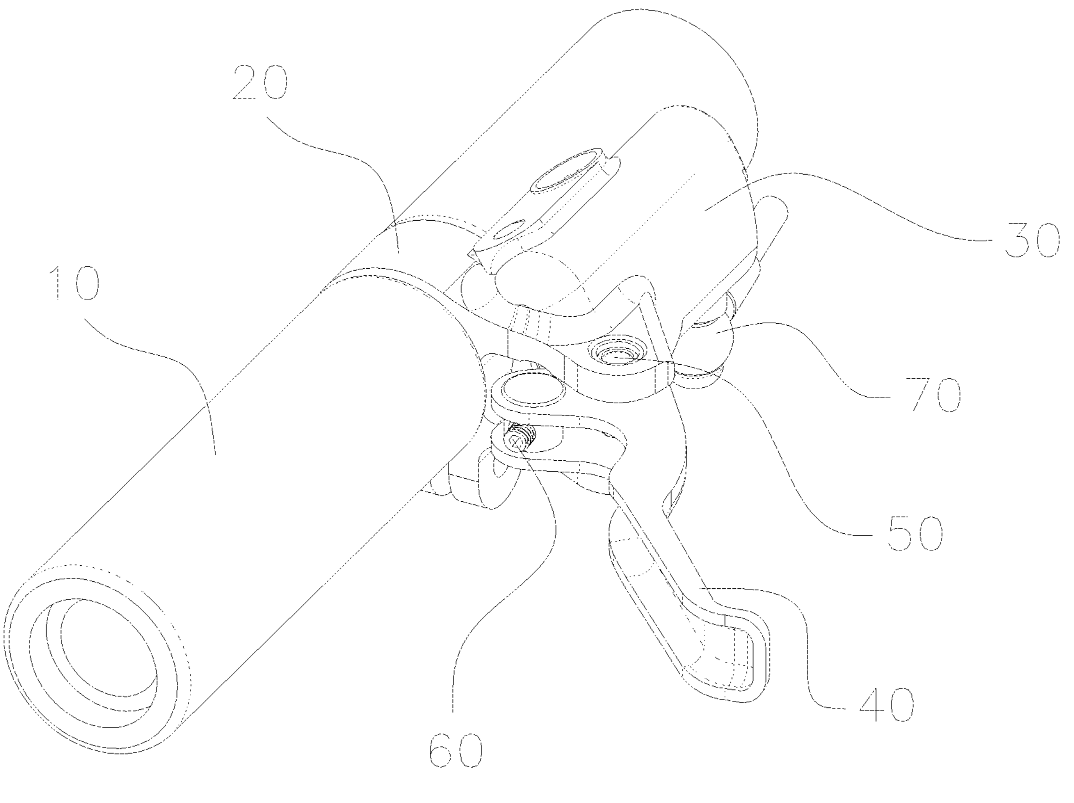
FIG. 1 is a perspective view to show the brake system of the present invention.
Figure 2:
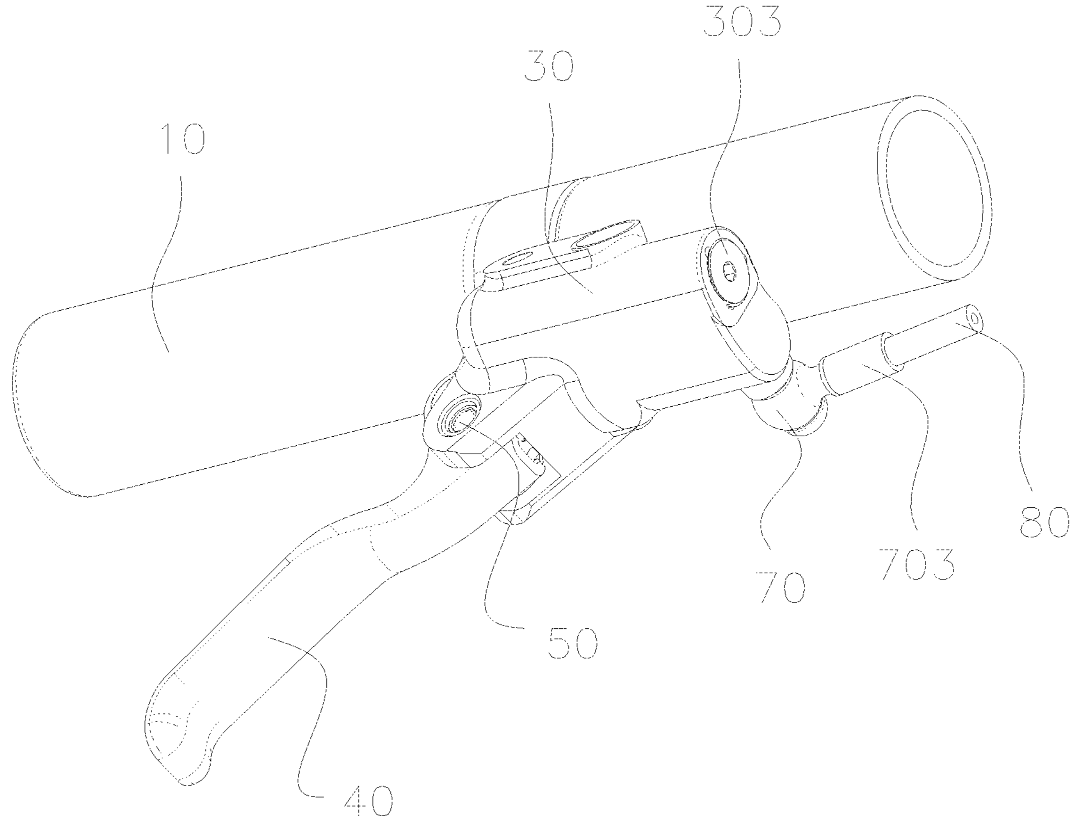
FIG. 2 is another perspective view to show the brake system of the present invention.

Referring to FIGS. 1 and 2, the brake system of the present invention comprises a bicycle frame 10 and a housing 30 mounted to the bicycle frame 10. In this embodiment, the housing 30 is secured to the bicycle frame 10 by a fastener 20, wherein the fastener 20 can be integral with the bicycle frame 10 to enhance the stability to secure the housing 20. The housing 30 includes an oil chamber 301 for brake fluid storage. One of two ends of the housing 30 is hinged to a brake lever 40 via a hinge 50. In this embodiment, the hinge 50 has a torsion spring mounted thereon which provides a returning force for the brake lever 40.

The brake lever 40 includes an arm 60 for compressing the brake fluid within the oil chamber 301 to initiate braking. The housing 30 has a connector 70 connected to another one of the two ends thereof. The connector 70 communicates with the oil chamber 301 and is located close to the bicycle frame 10. The connector 70 has an output end which is connected to a hose 80 that runs along the bicycle frame 10.

Figure 4:
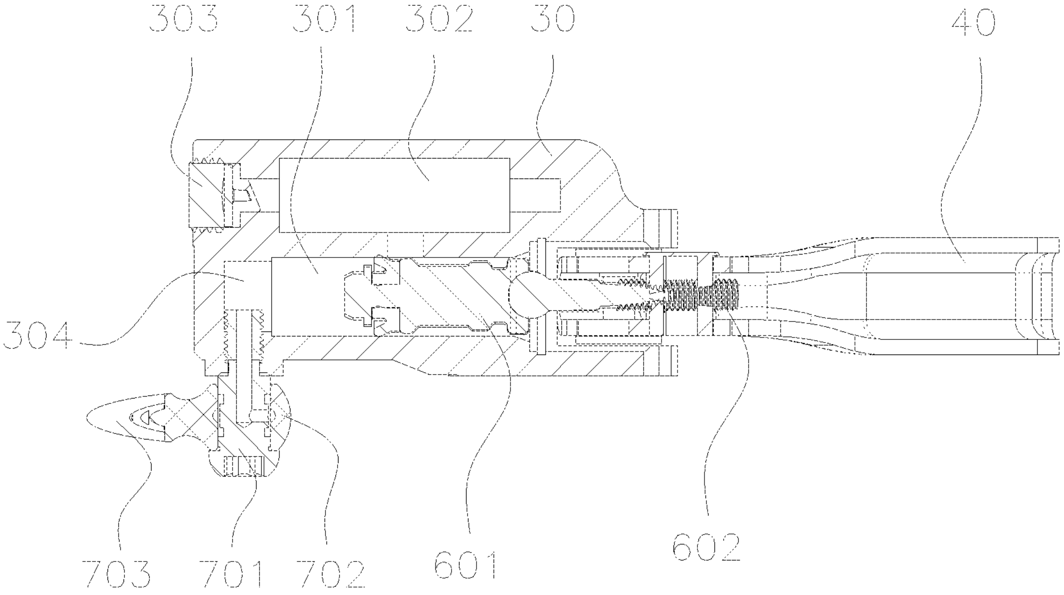
FIG. 4 is a cross sectional view, taken along line A-A in FIG. 3.
Figure 5:
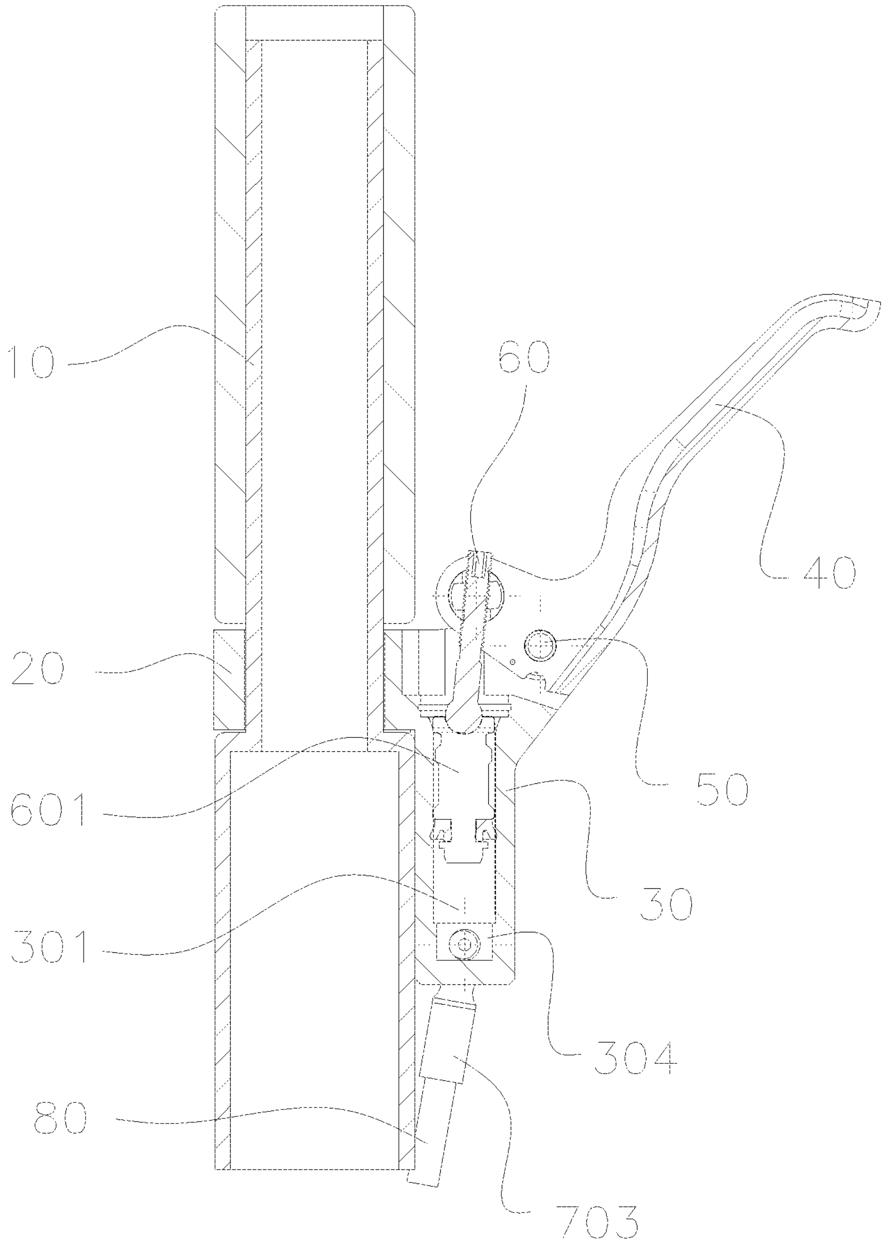
FIG. 5 is a cross sectional view, taken along line B-B in FIG. 3.

As shown in FIGS. 4 and 5 showing the first embodiment of the present invention, wherein the housing 30 includes a communication chamber 304 defined therein and located away from the arm 60. The communication chamber 304 communicates with the oil chamber 301. The housing 30 includes a secondary chamber 302 defined therein and communicates with the oil chamber 301. A plug screw 303 is located at the opening of the secondary chamber 302 to seal a filling port.

As shown in FIGS. 1 and 3 to 5, the arm 60 includes a piston 601 located within the oil chamber 301 and slidable along the depth direction of the oil chamber 301. A spherical screw 602 includes a ball head and a threaded shaft, wherein the ball head extends into the oil chamber 301 and pushes the piston 601 for compressing brake fluid. The threaded shaft is located outside the oil chamber 301 and connected to the brake lever 40.

By incorporating the connector 70, the routing of the hose 80 is adjusted to align with the bicycle frame 10 so as to prevent substantial misalignment between the hose 80 and the bicycle frame 10, which could lead to damage. Furthermore, thanks to the arm 60, when the brake lever 40 is gripped and squeezed, enables the ball head of the spherical screw 602 to push the piston 601 to slide along the depth direction of the oil chamber 301. This compression of hydraulic fluid is directed through the connector 70 into the hose 80, reaching the calipers of the oil brake, resulting in braking action on the wheel. The manufacturing and assembly process is straightforward, facilitating easy installation. In addition, the delay in hydraulic fluid compression is minimal, leading to effective braking performance.

Figure 3:
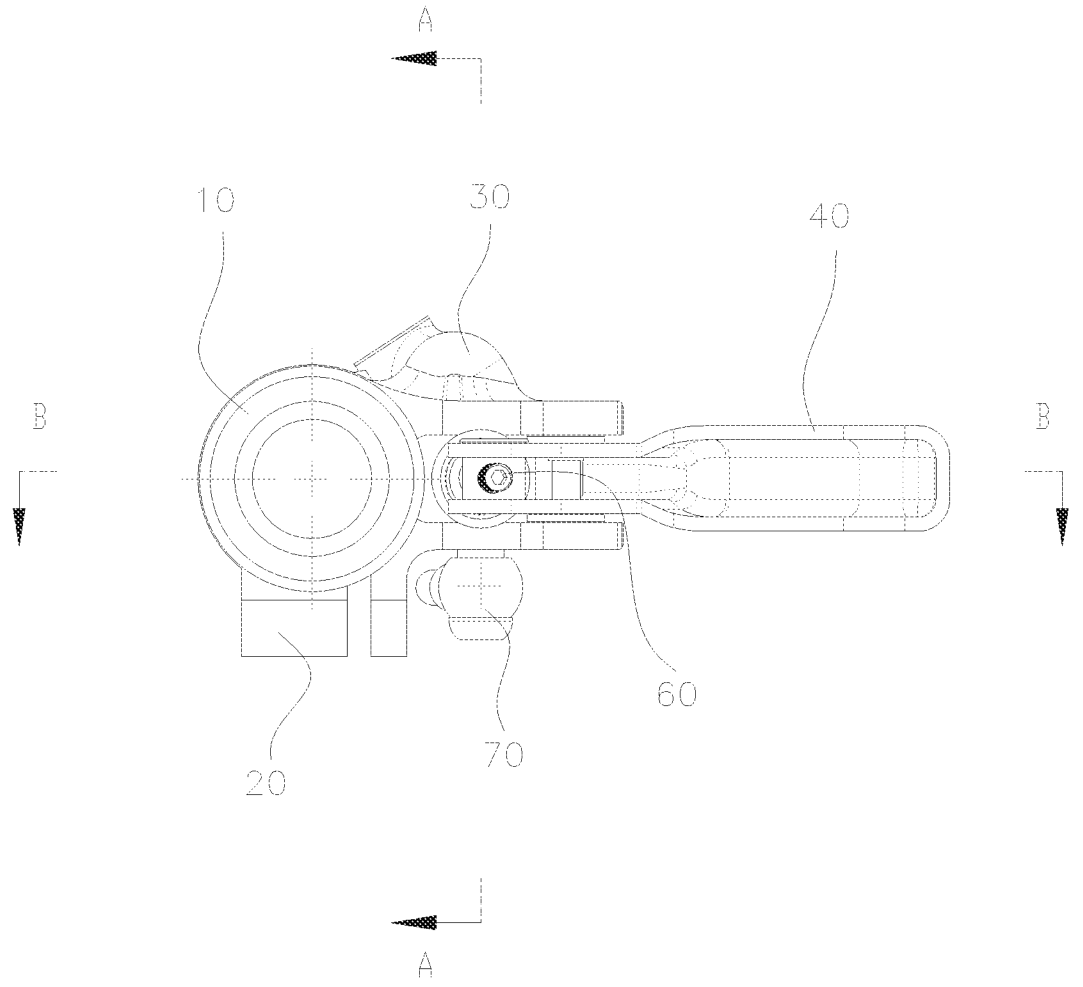
FIG. 3 is an end view of the brake system of the present invention.

As shown in FIGS. 3 to 5, showing the second embodiment of the present invention, the differences between the second embodiment and the first embodiment of the present invention are that the connector 70 includes a bolt 701 threadedly connected to the housing 301 and extending into the communication chamber 304. The bolt 701 has an oil passage, and the output end of the oil passage is open on the wall of the bolt 701 that is located outside the communication chamber 304. An end part 702 is fitted onto the bolt 701 and includes an oil groove that communicates with the output end of the oil passage of the bolt 701. A hollow column 703 has one of two ends thereof connected to the outer wall of the end part 702 and communicating with the oil groove. Another one of the two ends of the hollow column 703 is connected to the hose 80 so as to enable the hose 80 to align with the bicycle frame 10 and establish internal routing. This arrangement prevents significant misalignment between the hose 80 and the bicycle frame 10, which could lead to damage.

As shown in FIG. 4, the oil groove of the end part 702 is an annular groove which is easily connected to the oil passage of the bolt 701, and the end part 702 is universally rotatable.

According to the aforementioned embodiments of the brake system of the present invention, the routing of the hose 80 is configured to align with the bicycle frame 10, preventing significant misalignment between the hose 80 and the bicycle frame 10 that could lead to damage. Moreover, in combination with the setup of the connector 70, it facilitates the multi-directional connection of the hose 80 and reduces the likelihood of fluid leakage.

While we have shown and described the embodiment in accordance with the present invention, it should be clear to those skilled in the art that further embodiments may be made without departing from the scope of the present invention.

What is claimed is:

1. A brake system comprising:

a bicycle frame (10) and a housing (30) mounted to the bicycle frame (10), the housing (30) including an oil chamber (301) for brake fluid storage, one of two ends of the housing (30) being hinged to a brake lever (40) via a hinge (50), the brake lever (40) including an arm (60) for compressing the brake fluid within the oil chamber (301) to initiate braking, the housing (30) having a connector (70) connected to another one of the two ends thereof, the connector (70) communicating with the oil chamber (301) and located close to the bicycle frame (10), an output end of the connector (70) connected to a hose (80) that runs along the bicycle frame (10);

wherein the connector (70) includes a bolt (701) threadedly connected to the housing (301) and extending into the communication chamber (304), the bolt (701) has an oil passage, an output end of the oil passage is open on a wall of the bolt (701) that is located outside the communication chamber (304), an end part (702) is fitted onto the bolt (701), the end part (702) includes an oil groove that communicates with the output end of the oil passage of the bolt (701), a hollow column (703) has one of two ends thereof connected to an outer wall of the end part (702) and communicating with the oil groove;

the oil groove of the end part (702) is an annular groove; and the end part (702) is universally rotatable with the annular groove providing continual fluid communication between the oil passage of the bolt (701) and the hollow column (703) through rotation of the end part (702).

2. The brake system as claimed in claim 1, wherein the housing (30) includes a communication chamber (304) defined therein and located away from the arm (60), the communication chamber (304) communicating with the oil chamber (301).

3. The brake system as claimed in claim 2, wherein the housing (30) includes a secondary chamber (302) defined therein and communicating with the oil chamber (301), a plug screw (303) is located at an opening of the secondary chamber (302) to seal a filling port.

4. The brake system as claimed in claim 2, wherein the arm (60) includes a piston (601) located within the oil chamber (301) and being slidable along a depth direction of the oil chamber (301), a spherical screw (602) includes a ball head and a threaded shaft, the ball head extends into the oil chamber (301) and pushes the piston (601) for compressing brake fluid, the threaded shaft is located outside the oil chamber (301) and connected to the brake lever (40).

5. The brake system as claimed in claim 1, wherein another one of the two ends of the hollow column (703) is connected to the hose (80).

6. The brake system as claimed in claim 1, wherein the hinge (50) includes a torsion spring mounted thereon which provides a returning force for the brake lever (40).

* * * * *